United States Patent [19]

Ohara et al.

[11] Patent Number: 5,739,814

[45] Date of Patent: *Apr. 14, 1998

[54] INFORMATION STORAGE SYSTEM AND BOOK DEVICE FOR PROVIDING INFORMATION IN RESPONSE TO THE USER SPECIFICATION

[75] Inventors: Makoto Ohara, Tokyo; Shinichirou Sugiura, Fokyo, both of Japan

[73] Assignee: Sega Enterprises, Tokyo, Japan

[*] Notice: The term of this patent shall not extend beyond the expiration date of Pat. No. 5,485,176.

[21] Appl. No.: 951,862

[22] Filed: Sep. 28, 1992

[51] Int. Cl.⁶ .......................................................... G09G 3/02
[52] U.S. Cl. ............................ 345/173; 345/156; 345/179
[58] Field of Search ........................ 341/31–34; 434/336; 345/156, 173, 175, 179

[56] References Cited

U.S. PATENT DOCUMENTS

| | | | |
|---|---|---|---|
| 3,600,592 | 8/1971 | Mahan et al. | 341/31 X |
| 4,782,335 | 11/1988 | Gussin. | |
| 4,802,092 | 1/1989 | Harte. | |
| 4,809,246 | 2/1989 | Jeng. | |
| 4,820,167 | 4/1989 | Nobles et | 434/336 |
| 4,839,634 | 6/1989 | More et al.. | |
| 4,862,152 | 8/1989 | Milner. | |
| 4,862,497 | 8/1989 | Seto et al.. | |
| 4,879,557 | 11/1989 | Roche | 341/31 X |
| 4,884,974 | 12/1989 | Desmet. | |
| 4,890,096 | 12/1989 | Taguchi et al.. | |
| 4,891,474 | 1/1990 | Kelly. | |
| 4,899,368 | 2/1990 | Krohn et al. | 379/355 X |
| 4,907,264 | 3/1990 | Seiler et al. | 379/355 |
| 4,933,544 | 6/1990 | Tamaru. | |
| 5,034,598 | 7/1991 | Poland | 341/31 X |
| 5,209,665 | 5/1993 | Billings et al. | 341/34 X |
| 5,485,176 | 1/1996 | Ohara et al. | 345/156 |

FOREIGN PATENT DOCUMENTS

| | | |
|---|---|---|
| 0313976 | 10/1988 | European Pat. Off.. |
| 0364884 | 10/1989 | European Pat. Off.. |
| A0390303 | 10/1990 | European Pat. Off.. |
| 0455147 | 4/1991 | European Pat. Off.. |
| 50-118355 | 4/1977 | Japan. |
| 52-75428 | 6/1977 | Japan. |
| 56-214622 | 12/1981 | Japan. |
| 59-068072 | 4/1984 | Japan. |
| 59-111560 | 6/1984 | Japan. |
| 60-151732 | 8/1985 | Japan. |
| 62-107360 | 5/1987 | Japan. |
| 2127598A | 4/1984 | United Kingdom. |
| 2149544 | 6/1985 | United Kingdom. |
| 9015402 | 6/1990 | WIPO. |
| WO9107715 | 11/1990 | WIPO. |
| WO9215077 | 2/1992 | WIPO. |

OTHER PUBLICATIONS

BYTE, vol. 16, No. 9, Sep. 1991, pp 881S–7 to 881S–12, "Kyocera Rustles Up the Refalo", by Andy Redfern.
Machine Design, Cleveland, Ohio, Vo. 63, No. 17, Aug. 22, 1991, p. 30, "Electronic Sketch Pad Turns TV Into Easel".

Primary Examiner—Richard Hjerpe
Assistant Examiner—Amare Mengistu
Attorney, Agent, or Firm—Price, Gess & Ubell

[57] ABSTRACT

An electronic book which can store, in a ROM, a computer program, is integrated with graphic and textual material on a series of pages. Various input devices such as a finger, a light pen, a touch pen, etc. can be utilized with a sensing circuit combined with the page for inputting data into the computer system. The computer system can display this information in both an audio and visual manner.

22 Claims, 6 Drawing Sheets

FIG. 9

INFORMATION STORAGE SYSTEM AND BOOK DEVICE FOR PROVIDING INFORMATION IN RESPONSE TO THE USER SPECIFICATION

BACKGROUND OF THE INVENTION

1. Field of the Invention

The present invention is directed to a unitary manual and software package to simplify the operation of a software program and, more particularly, includes an interactive electronics book with a computer-based entertainment system.

2. Description of Related Art

The proliferation of personal computers to consumers has drastically increased in the last ten years. Personal computers are generally of a desktop variety, are housed in a console, and are usually addressed through a keyboard or a mouse. Software for use with such computers contains information stored on various recording media such as floppy disks, optical disks, etc. Such software is usually sold separately to the end user. Frequently operating instructions for such software are provided in manuals, instruction sheets, books, pamphlets, and the like, which are generally physically separate from the software. The user must take care of both the personal computer software and the operating manual so that they are not separated, since frequently the operating manuals are essential for the use of the software. As the capacity of the computer hardware has increased while its physical size has been reduced, variations in the form of the computer hardware have occurred, and personal computers now come in the form of notebooks and other variations.

Additionally, the information now available on computers is exponentially increasing so that a high level of entertainment, education, and the like that is rich in variety and particularly adapted to a personal computer format is being provided. As personal computers become more widely popular, it is anticipated that an additional development of uses and games, education, and the like can be readily expected.

A problem has occurred in rendering such hardware and software to a user-friendly status.

Picture books, particularly for children, have attempted to incorporate microprocessor-driven systems to produce both visual and audio effects. Such picture books have included electronic organs, melody-generating units, voice-synthesizing units, and the like to provide additional effects through sound and light to accompany the viewing of graphic items and text in the picture books. As can be appreciated, however, these types of picture books have a limited range of sounds, lights, and the like, and it is generally not possible to expand such programs to provide a wide variety of options or to achieve the higher level of entertainment, education, and the like which has come to be expected with the use of personal computers.

Conventionally, cards are used which can consist of sheets of paper and the like with images such as graphics, text, and codes printed or recorded on the surface using special inks or special paints that are conductive. With electronic books, which are used for entertainment, learning, and the like, data which are stored on such cards are read by touch pens and the like, and then played back in the form of videos and voices using external devices such as televisions. With this type of conventional electronic device, a number of the cards which store the data as described above are prepared as sheets on which printing and the like are performed one sheet at a time. The desired ones are selected from the group and set in the device to be read.

However, in applying such devices for use in entertainment, learning, and the like, there are many cases where there is a desire to display a large amount of such image data at the same time. In such cases, since there are limits on the data storage capacity of a single card, it is necessary to insert a large number of cards one after the other. If many elements such as characters are selected, the number of times the cards must be removed is increased. As a result, the operation is extremely bothersome and requires much effort, and also increases the likelihood that the cards will be damaged.

In light of such conventional problems, the present invention has the objective of offering an electronic book with which the cards, which are the data holder used by the aforementioned sort of electronic devices for entertainment, learning, and the like, are structured in a book form, and are designed to enable easy reading of the data without effort simply by turning the pages.

Thus, there is still a demand in the prior art to provide improved utilization of a combination of picture book information to simulate a book, while creating a user-friendly interface for inputting information to a computer-based system for ultimate display to the user.

SUMMARY OF THE INVENTION

The present invention pertains to an electronic book which is used in devices for entertainment, learning, and the like, whereby image data and the like which are on sheet cards are electronically read and displayed.

The aforementioned objective of the present invention is fulfilled by stacking together a number of sheets, on the surfaces of which data related to the personal computer software are printed or recorded one at a time, and a recording means for the aforementioned personal computer software, wherein a connection means is used to connect the aforementioned personal computer software to a personal computer, thereby enabling its operation.

Many types of software for personal computers cannot be used without reading the operating manual. However, with the present invention, the operating manual and the personal computer software are integrated in a book. For this reason, there will be no cases where the operating manual is lost. Since there are limits on the amount of data that can be shown within a single limited screen, a book and personal computer software are integrated. The data written in the book are read while proceeding with the software operations, thereby making it possible to easily understand even difficult software.

In order to solve the above-mentioned problems, an electronic book capable of touch pointing and reading of the present invention is structured so that it comprises the following: a book, which is composed of a number of stacked sheets, on the surfaces of which data such as graphics, text, and codes are printed or recorded one sheet at a time; a reading output means which reads and outputs the aforementioned data; a control device, which comprises an input signal sensing circuit that senses signals from the aforementioned reading output means, and a control circuit, which outputs video and voice signals after processing signals from the input signal sensing circuit and signals from a ROM which stores the contents of the data of the aforementioned sheets; and an output playback device, which plays back the output of the control circuit.

With the electronic book capable of touch pointing and reading of the present invention, which is structured as described above, the book is set down, and is opened to the pages of the sheets on which the desired data are stored. Next, a designator means such as a special pen, made of metal, is brought into contact with a desired location on the surface of the sheet in order to read the data. The signals are then processed by the control device, and displayed on an output playback device such as a television monitor. In displaying a large number of images and the like at the same time, the pages of the book are turned and opened to the specific pages with the desired data, without switching one book for another. The above operations are then repeated.

An information storage system simulating a book format is provided as an input to a computer-based system for providing information to a user. A plurality of sheets containing visual indicia can be arranged in a book format wherein the sheets are operatively connected together for storage purposes and can be sequentially separated and displayed to the user. A memory device, such as a ROM, can electronically store information that is coordinated with the spacial location of the visual indicia on each of the individual sheets. The operator can input a designated position on a specific sheet relative to visual indicia, for example, through the use of a touch switch system: for example, a touch pen, an optical pickup system, an ultrasonic pickup system, and a bar code system. A control circuit can respond to the operator input to address the memory device for providing data corresponding to the spacial location of the visual indicia. The specific data can be subjectively determined and can include both text information and graphic displays. This stored data can be appropriately processed to drive a visual and/or audio output. Additionally, this information, for example, as presented on a liquid crystal display or CRT tube, can be manipulated by the user to rearrange its location and to alter the format, such as by adding color information. Operator controls can be provided for further processing of this data in a manner highly pleasing to the user.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

BRIEF DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an electronic book and an information storage and display system using the book.

Figure 1:
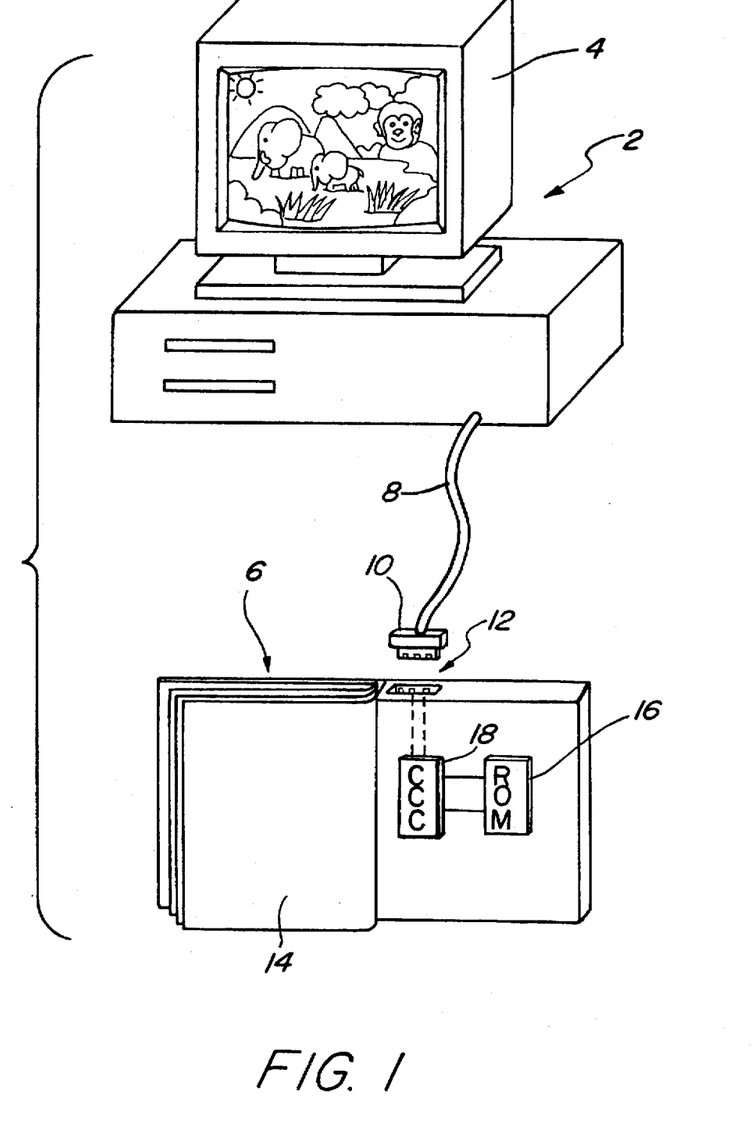
FIG. 1 discloses a perspective view of one embodiment of the present invention.

Referring to FIG. 1, a personal computer 2 with a CRT monitor 4 can be connected to an electronic book 6 having multiple sheets of the present invention. A connector wire 8 with an appropriate connector 10 can be connected into a socket or terminal junction 12 located on the electronic book 6. The electronic book 6 also includes a number of sheets 14 that are bound like a book and which can carry data in the form of text and graphics related to the personal computer software. Programs can be stored in a ROM 16 which can be accessed through a control circuit chip (CCC) 18 that can address the ROM 16 and provide the stored information to the personal computer 2. The information stored in the ROM 16 can be specifically related to a specific location on a specific sheet.

As can be readily appreciated, personal computer software can be packaged in the electronic book format of the present invention, thereby ensuring that the instruction manual or operating manual is readily integrated with the stored program and maintained together as an operative unit. Each of the sheets 14 of the electronic book 6 can provide instructions to supplement the information provided on the monitor 4. Since there are limits on the amount of data that can be shown within a single limited screen, the book and the personal computer software are conveniently integrated with information written in the book to supplement the software operation. Thus, the data written in the book is read while proceeding with the software operation, thereby making it extremely user-friendly for the operator to understand even relatively difficult software.

Figures 4, 5, 6, 7, 8:
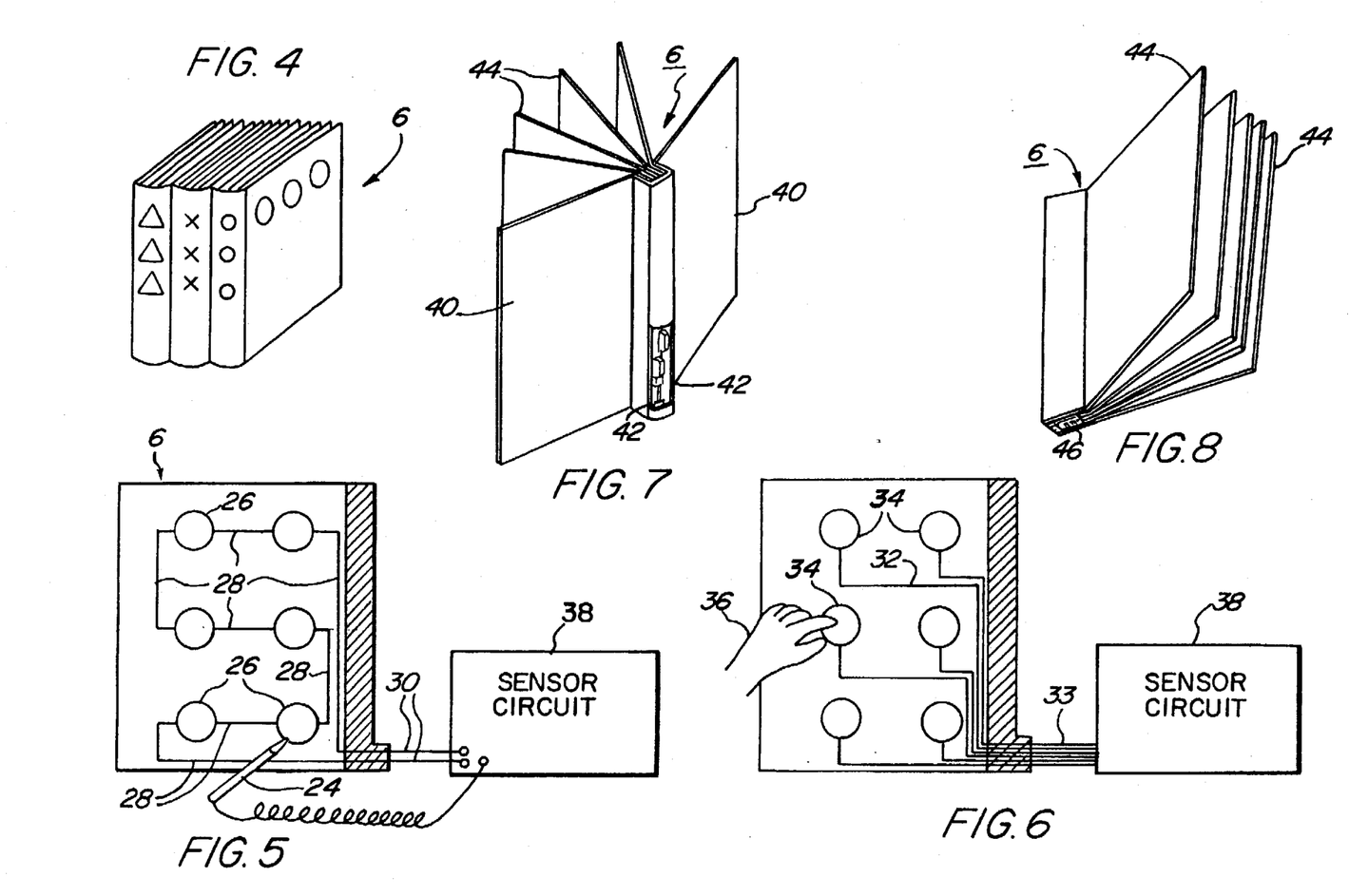
FIG. 4 discloses a perspective view of one embodiment of the present invention.
FIG. 5 discloses a schematic illustration of the present invention with a touch pen.
FIG. 6 discloses a schematic illustration of the present invention responsive to contact pressure.
FIG. 7 shows a perspective view of one embodiment of an electronic book of the present invention.
FIG. 8 discloses a perspective view of another example of an electronic book of the present invention.

As can be seen in FIG. 4, various different programs can be conveniently structured into an electronic book format of the present invention so that an individual book format for each of the stored programs integrated with its manual or operating instructions are unitarily connected. Thus, the software for the personal computer in fact takes a book-like configuration for each individual software package. The individual sheets 14 in each of the books carries printed or recorded information that can be readily read by the operator. The programs stored on a ROM 16 can be designed to be attachable or detachable on either the back or front cover of the electronic book 6. These programs can be electronically addressed through a control circuit chip 18 and transmitted through the connector wire 8 to the personal computer 2. The personal computer 2 is connected to the television monitor 4 for a video display.

Figure 2:
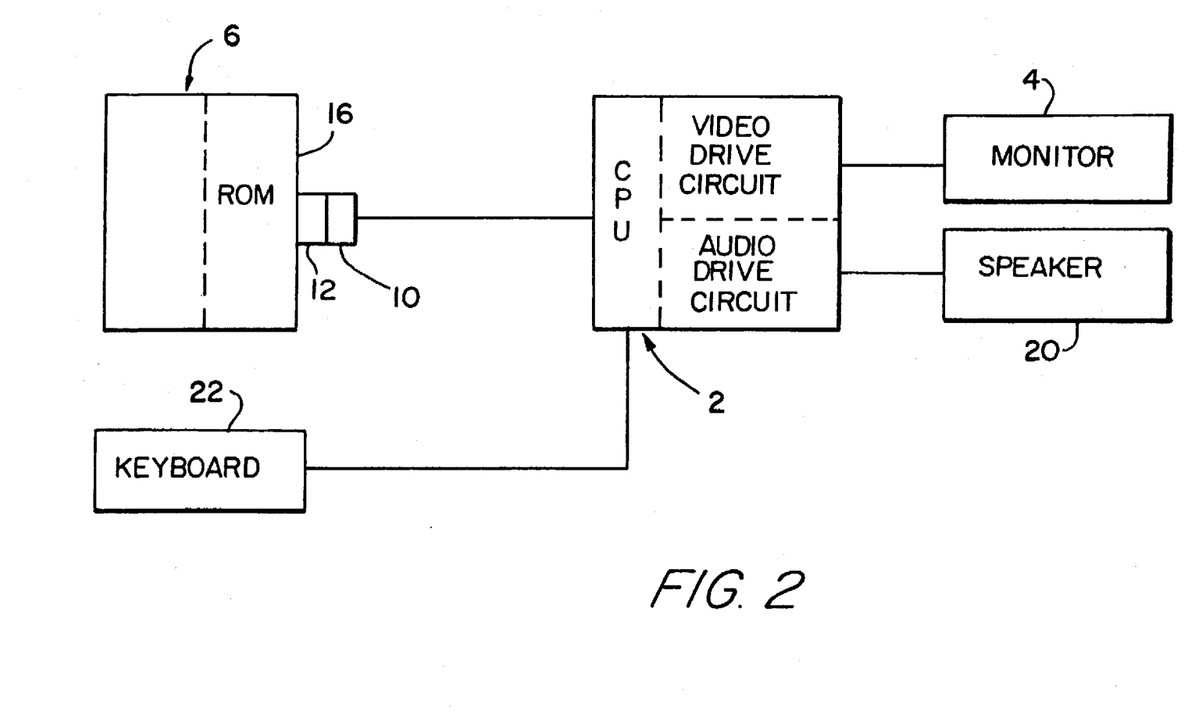
FIG. 2 discloses a schematic diagram of components of the present invention.

Referring to the block diagram of FIG. 2, the electronic book 6 includes the ROM 16 that can store the programs, and also data that is mapped in the memory device to correspond to indicia on each sheet of the book 6. The ROM 16 is connected through the connector 10 and terminal 12 with the CPU 2. A keyboard 22 can also be connected to the personal computer 2. The television monitor 4 can be driven by an appropriate video drive circuit, while a speaker 20 can provide audio output including a synthesizing voice output.

In operation, the operator will select the appropriate software in an electronic book 6 according to its outside display cover and will make an electrical connection to the personal computer 2. As with the normal use of a book, a table of contents, and the like can be contained on the sheets 14 so that the desired items or a menu desired for operation can be selected and the appropriate pages can be turned. The personal computer 2 can be operated through the keyboard 22 in accordance with the explanation that is presented in the book. As can be readily appreciated, this assembly of both the operation manual and the program makes it possible for everyone from children to adults to use a variety of software in an easy mode of operation.

Figure 3:
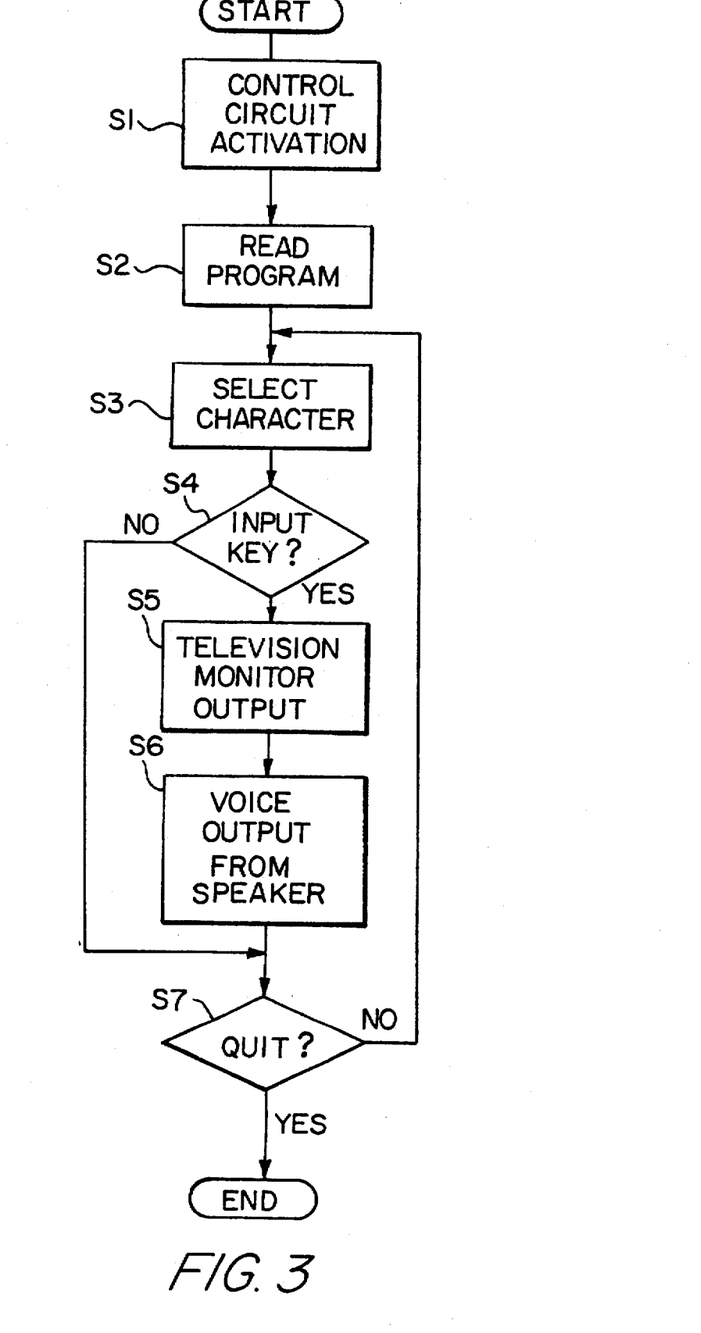
FIG. 3 discloses a flow chart setting forth one example of the operation of the present invention.

Referring to the flow chart of FIG. 3, after a connector 10 and terminal 12 between the personal computer 2 and the electronic book 6 are electronically engaged, the keyboard 22 can then be activated to designate a starting operation during which the control circuit (CPU) inside the personal computer 2 will initiate an operation, such as step S1. The initial operation will permit the personal computer 2 to address a program via the control circuit chip 18 and load it into the appropriate memory in the personal computer 2. The monitor 4 will be activated consistent with the purpose of the program. For example, a drawing program screen can be displayed on the television monitor 4. Such a program, for example, can make it easy for drawing moving pictures with sound effects using a variety of pictures in the illustration books. For example, one format of the electronic book 6 can comprise various images on the sheets 14 that can be selected, and then realized, in a video image on the monitor 4. In one possible operation of the program, the television monitor 2 can actually display a variety of characters after it has read the program stored in the ROM 16 in step S2. The keyboard 22 can then be used to select a particular desired character in step S3 by designating a particular location, or even an address, associated with a character or image on a sheet. A decisional box in step S4 can determine whether or not a key input is necessary. If there is a key input, then the necessary data is outputted to the television monitor 2 in step S5. A speaker 20 is capable of outputting any necessary voice and sound effects in step S6. Following this output of the program, or if there is no key input in step S4, it can be determined whether or not the operations are to be stopped in step S7. If they are to be continued, the control then returns to step S3 to enable the selection of additional characters.

As can be readily appreciated, a large number of different programs can be utilized that can include various activities that can be enjoyed by the entire family, such as various cute forms of illustrations, picture books, family quizzes, sounds, and pictures such as those in television quiz shows. Other examples include toy word processors to teach children, thereby allowing text to be produced easily and enjoyed, and even home karaoke can be performed that is, singing songs to words shown on a video screen, which can be enjoyed by all the viewers who are watching the video screen.

Karaoke is a device for providing background music so that a user may sing in accordance with the background music. The keyboard 22 can identify a specific spacial location designated by the user, for example, alphanumeric coordinates can be associated with pages of the electronic book 6 and typed into the system on a menu prompt.

While the characters can be selected using the keyboard 22, it is also possible for a sensor circuit to be provided relative to the sheets 14 so that a touch-style designation means can further simplify the operation of the program.

Referring to FIG. 5, a schematic diagram of an alternative embodiment of the present invention for an electronic book 6 is disclosed wherein one of the sheets can utilize a touch pen 24 that is designed to contact specific contact touching areas 26. As shown in FIG. 5, these areas are arranged in series and are electrically connected with wiring 28. A terminal line 30 can interconnect these electrically conducting touching areas 26 to an external control sensing device that is capable of discriminating which specific touching area 26 is being contacted. For example, each of the interconnecting wires between the touch areas can have a specific resistance value. When the touch pen 24 is pressed against a specific touching area 26, a different voltage signal can be read. The control sensor circuitry 38 can then discern the specific touch area that is designated by the user. This can eliminate the necessity of providing an input by the keyboard 22 and can further render the operation of the program user-friendly. The output of the sensor circuit 38 to the computer system is not shown, but would be a wire connection, as known in the art.

Referring to FIG. 6, an alternative embodiment is disclosed wherein a sheet 14 can have an integral series of specific touching areas 34 that are designed to receive the user's finger 36. The control sensor circuitry 38 can be responsive to the touch of the finger, for example, by having the touching area 34 comprising a switch, or even being a miniature microphone for picking up sound generated by contact or scraping of the finger with the touching area. The touching area 34 can be interconnected by a terminal line 33 to the sensor circuitry 38. In essence, each of the individual touching areas 34, when contacted by a finger, will generate an appropriate signal to designate that specific spacial location on the sheet. The printing of indicia on the sheet 14 will, of course, be coordinated with specific touching areas integrated or laminated into the composite sheet.

As can be readily appreciated, the present invention enables not only the integration of the operating manual or operating instructions with a specific program to facilitate the use of software with personal computers, but further can expand the amount of data which can be supplied to the user in a particularly user-friendly format in addition to the data that can be shown on the monitor 2. The electronic book 6 of the present invention can be used, for example, with an illustrated drawing software program wherein a number of pictures can be prepared and stored in advance in a ROM memory, and then read from that memory for display on the monitor screen. Thus, persons with poor drawing skills can still produce excellent pictures through utilization of this combination of text and graphics in a book format. As can be readily appreciated, the basic images can then be further manipulated if desired, for example, by adding color or making modifications of the basic pattern with additional input by the user. The user can flip through the pages and interface directly with the pages when the appropriate sensor technology is incorporated in an individual sheet. As can be appreciated, the sensor technology can be overlaid with coordinated printed indicia and pictures in providing the individual sheets.

Referring to FIG. 7, a perspective view of an electronic book 6 is shown having a front and back cover 40 with a rear portion on its spline cut away to expose a series of terminals 42. The sheets 44 can have printed, on their surfaces, graphic images, text, and codes using, for example, conductive paint or ink. The terminals 42 can be connected to each page of the sheets 44. During use, these terminals are electrically connected to an appropriate connector which can interface with a microprocessor circuit (not shown).

FIG. 8 discloses an alternative view of an electronic book wherein a series of index-type terminals 46 can be situated on the bottom of each of the pages or sheets in the book. An appropriate connector (not shown) can be attached to the bottom edge for making electrical contact. As can be appreciated, the type of terminal for connection to an exterior circuit is not limited to the embodiments shown in FIGS. 7 and 8 or to the embodiment shown in FIG. 1.

With an electronic book of this configuration, data can be read from the sheets, both visually by the operator and electronically, through the use of a sensing or touching device such as a special pen, or even a finger, which can be brought into contact with sensitized touch areas that are positioned across the sheet. These touch areas can correspond to printed or recorded data on the surfaces of the sheets.

Referring, for example, to FIGS. 5 and 6, different examples of generating electrical signals corresponding to specific touch areas on a sheet are disclosed. Thus, either a finger or a touch pen can be brought into contact with a specific touching area. For example, a voltage difference can be ascertained by an appropriate sensor circuit in order to provide a user-friendly input signal to the personal computer system. As shown in FIGS. 5 and 6, each page of the electronic book 6 is similarly connected to the sensor circuit 38. As a result, the sensor circuit 38 can determine directly in a single step which page is opened and which indicia located thereon is specified by an operator. A direct determination system is provided so that specified indicia is directly identified through a direct connection from each page via the electric wires 26 and 30 or 32 and 33.

Figure 9:
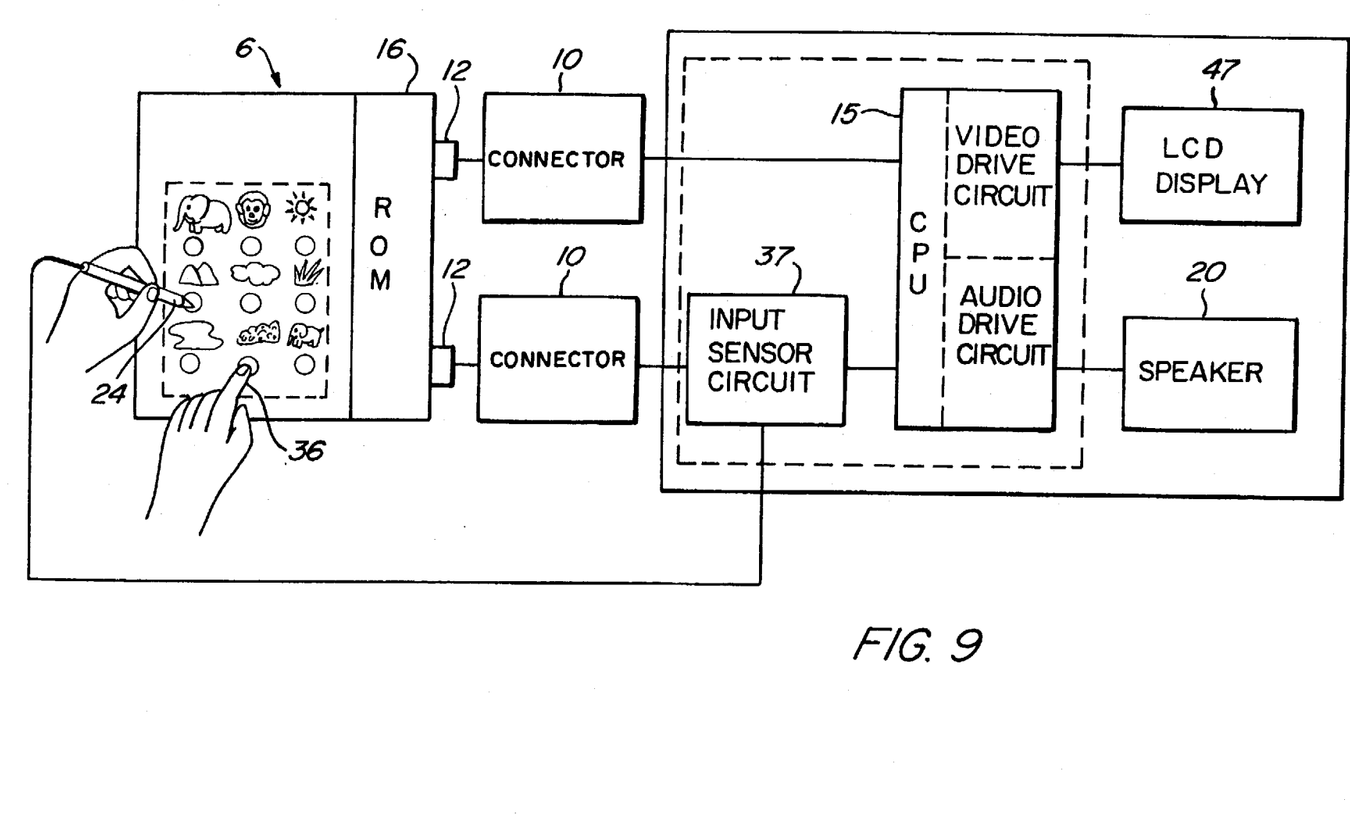
FIG. 9 discloses a schematic diagram of an information storage system of the present invention.

FIG. 9 discloses a schematic block diagram setting forth one example of utilizing the electronic book of the present invention as applied to an audio/visual electronic device for entertainment, learning, and the like. In this embodiment, the electronic book 6 can include an integrated ROM 16 which stores the contents of the data for each of the sheets in the electronic book 6. An electrical connector 10 can electrically connect the electronic book 6 with the personal computer 2.

Box 37 is an input signal sensing circuit which can sense signals from the electronic book 6. Box 15 is a control circuit which can process those signals, and also the data addressed from the ROM 16, to thereby output video and voice signals which can be appropriately used in an output playback device. Thus, a video drive circuit is capable of driving, for example, an LCD display 47 or a television monitor, and an audio drive circuit is capable of driving a speaker 20.

The user interface with the pages of the electronic book 6 can be accomplished, for example, through a finger 36 or an electronic touch pen 24, as described in the previous examples. As can be readily appreciated, a small transmitter could even interface with touch areas to provide a signal of wireless transmission to a pickup receiver connected to the personal computer as an input for the input signals of designating specific indicia by the user. Alternative methods, such as an IR transmission, could also be used, as known in the industry.

Figures 10, 11:
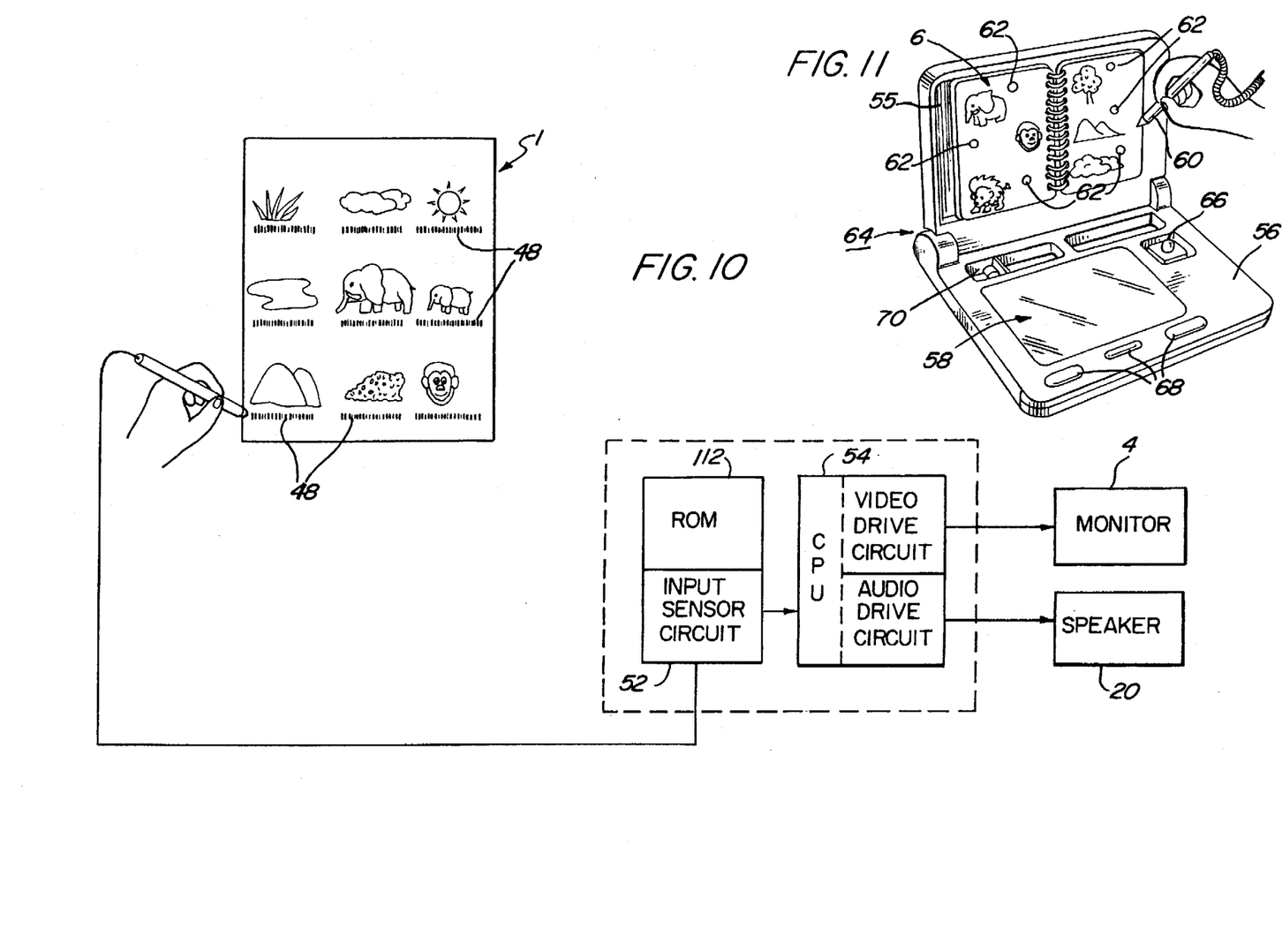
FIG. 10 discloses an alternative schematic diagram of an information storage system.
FIG. 11 discloses a perspective view of one embodiment of the present invention as a drawing system for children.

An alternative embodiment is also disclosed in FIG. 10. In this embodiment, the ROM 112 for storing the program could be stored inside of the control circuit of the personal computer or associated with the sensor circuit for attachment as an input signal into the CPU of the personal computer 2. Additionally, the electronic book 6 can include bar code indicia 48, which can be read by the light-transmitting and pickup pen 50 for transmission to the control sensor circuitry 52. Thus, the pickup pen 50 can identify a specific spacial location in the book 6 which is coordinated with data stored in the ROM 12. Again, the CPU control circuit 54 can be connected to an video drive circuit and an audio drive circuit for driving a television monitor 4 and a speaker 20, respectively.

As can be readily appreciated, various forms of user-friendly inputting of the visual indicia and text from the electronic book 6 can be accomplished, such as the operator's finger, a touch pen, a light bar reader, etc. It should also be appreciated that the speaker 20 and the monitor 4 or the LCD display 46 can be built into a console or housing for dedicated computer systems.

As can be readily appreciated, the particular circuitry of the electronic book can be varied to accommodate either a system approach for combining with a separate personal computer, or a dedicated system for a particular application, such as an entertainment or gaming system.

Referring to FIG. 11, a practical example of an electronic book of the present invention is provided and illustrates a picture drawing entertainment device 64 for children that can be interconnected with a television monitor, for example, as shown in FIG. 1. The book 6 is placed in a housing or lid member 55 having an indented storage space for receiving and holding the book 6. This upper lid member 55 can fold over a bottom housing member 56 that can support a sensor or touch panel 58. The touch panel 58 can provide specific coordinate information selected by the user. The book 6, when mounted on the upper lid 55, can have its terminals which are connected to each of the sheets appropriately connected with an electrical connector (not shown).

In operation, the touch pen 60 can be utilized to touch one of the sensitized touching areas 62 to indicate a graphic image such as an "elephant" on the surface of the sheet in the electronic book 6. The pen or a finger can be used on the touch panel 58 to indicate on which area of the screen of the television monitor 4 the elephant image should be placed. The images which are stored in a ROM are output to the screen of the television monitor (see FIG. 1), which can be appropriately connected with the entertainment device 64. An operator-controlled joystick 66 can be used to move the images on the television screen.

In the same manner, other characters, such as a monkey or a mountain, can be output to the television monitor screen 4 and further moved to suitably form a picture, as desired by the user. Alternatively, a set of control buttons 68 can be used to indicate the character position. A slide member 70 can be used to change the colors of the characters, the screen, and the like.

In summary, the electronic book can provide an information storage system along with a convenient, unitary operation manual and storage package for a software program. The book is formed by stacking a number of sheets so that they are interleaved like a book. The surfaces of these sheets can be printed with indicia such as graphic images, text, and codes. The sheets can be further prepared so that they can provide input signals as to the position of data on the surface of the sheets. The electronic book can store a program in its ROM which can be connected to either a dedicated computer system or to a personal computer and appropriately addressed to load the program into the computer system. An input signal sensing circuit can be utilized to identify the operator's choice of various indicia from the pages so that a coordinated user-friendly input by the operator with, for example, the television monitor in the form of video images and a speaker in the form of audio sounds, can be generated.

In displaying images and voices, it is not necessary to insert and then replace different data holders. Rather, it is possible to simply read and display the data easily and without effort by simply turning the pages of the book. The sensor circuit system is designed to accommodate the pages. Thus, a child or an adult will perceive a user-friendly interface with a computer system for both educational and entertainment value.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. In an information processing system including a computer-based system and an information storage device for providing an input to the computer-based system, said information storage device comprising:
a plurality of sheets containing visual indicia, said plurality of sheets being bound together as a book and capable of being sequentially displayed to a user;
a position selection circuit integrated into each sheets
a read only memory device which stores, in an electronically readable form, information coordinated with a spatial location of the visual indicia on the sheets; and
first connector means for deriving the information stored in the read only memory; and said computer-based system comprising:
second connector means to which said first connector means is detachably connected whereby the information storage device with the read only memory device is removably mounted to the computer-based system;
input means including a touch pen for inputting location information of a selected position on a specific sheet relative to the visual indicia operationally connecting to the position selection circuit integrated in the specific sheet;
control means for responding to the input means to address the memory device for providing data corresponding to the spatial location of the visual indicia via said connector means;
processing means for processing the data to provide a video signal corresponding to the spatial location of the position selected by the user for displaying visual indicia on a display screen; and
a touch panel for providing further coordinate information relative to the visual indicia selected on the specific user sheet.

2. The invention of claim 1, wherein said computer-based system further includes a manual controller for providing further coordinate information relative to the visual indicia for displaying the visual indicium selected by the user on the display screen.

3. A system comprising an information processing device and a removably attachable, book shaped information storage device (1) the book shaped information storage device including:
(a) a sheet;
(b) a visual indicia located at an arbitrary position on the sheet;
(c) a position selection circuit integrated into the sheet and outputting positional information corresponding to a user-designated position;
(d) a ROM located in the book and storing a visual information packet corresponding to the visual indicia at a ROM address; and
(e) a book connector inputting the ROM address and outputting the visual information packet from the ROM; and (2) the information processing device including:
(a) a base connector detachably connecting to the book connector when said book-shaped information storage device is attached to the information processing device;
(b) means for receiving the positional information from the position selection circuit;
(c) control means for generating the ROM address based on the positional information received from the position selection circuit, for retrieving the visual information packet from the ROM by outputting the ROM address to the book connector via the base connector, and for receiving the visual information packet output by the book connector via the base connector; and
(d) data processing means for processing the visual information packet retrieved by the control means to provide a video signal for displaying the visual information packet on a display monitor.

4. The system of claim 3 further comprising a display monitor that is connected to the data processing means of said information processing device.

5. The system of claim 3, wherein the information processing device further includes a touch panel for providing userdefined coordinate information for displaying the visual indicia packet at a user-defined-location.

6. In an information processing system including in combination a book for providing information to a user and an information processing apparatus, said book comprising:
a plurality of sheets containing visual indicia thereon, wherein the indicia are located at arbitrary positions in two dimensions on the sheets, said plurality of sheets being bound together as a book;
a ROM memory device incorporated in the book and storing a plurality of packets of information, each packet of information corresponding to one of the visual indicia on a particular location on one of the sheets; and
data output means through which said packets of information are supplied to the information processing;
the information processing apparatus comprising:
connector means to which said data output means is detachably connected so that said information storage device with said ROM memory device is removably installed to the information processing apparatus;
input means for providing, in response to an operation by a user, a positional information indicative of a two-dimensionally designated position on a specific sheet among the sheets, said designated position being relative to a corresponding one of the visual indicia, wherein said input means supplies the positional information indicative of the two-dimensionally designated position on the specific sheet;
control means for responding to the input means to access the ROM memory device through said connector means at an address corresponding to the positional information which corresponds to the particular location of the corresponding one of the visual indicia relative to the designated position;

data processing means for processing the provided packet of information to provide a video signal for displaying visual information on a display monitor; and a touch panel for providing user-defined coordinate information for displaying the visual indicia packet at a user-defined location.

7. The invention of claim 6, wherein said information storage device includes a sensor circuit integrated into each of the sheets, said sensor circuit being functionally connected to said input means when the information storage device is installed to the information processing apparatus.

8. The invention of claim 6, wherein said information storage device includes a particular bar code indicative of a positional information printed in connection with each of the visual indicia on the sheets and said input means includes means for reading the bar code.

9. The system of claim 6 further comprising a display monitor that is connected to the data processing means of said information processing device.

10. A book device combining a software instruction manual and software program storage device in book-like form, for use with a data processing device having control means for two-dimensionally identifying a particular location on a specific sheet among a plurality of sheets of the book, each particular location being related to a corresponding one of visual indicia printed on the sheet and data processing means for processing information to provide a video signal for displaying visual information on a display monitor, said device comprising:

a plurality of sheets containing visual indicia comprising instructions for operating software therein, wherein the indicia may be located at arbitrary positions in two dimensions on the sheets, said plurality of sheets being bound in a book format;

a ROM memory device incorporated within the book for storing a plurality of packets of information, each packet of information corresponding to one of the visual indicia on a particular location on one of the sheets; and connector means for electrically and detachably connecting the ROM memory device to the data processing device so that the book-like device with the ROM memory device is removably installed to the data processing device, whereby a packet of information, from among the plurality of packets of information, related to the particular location identified by said means for identifying is input to the data processing device and whereby the program can be read into the data processing device for execution.

11. The invention of claim 10, wherein the indicia is operating instructions for running a software program stored in the memory device.

12. The invention of claim 10, wherein said book device further includes a sensor means integrated into each of the sheets and responsive to manual contact by a user.

13. The invention of claim 10, wherein said book device further includes bar codes printed with respect to the visual indicia on each sheet.

14. The book device according to claim 10, wherein the ROM memory device is of an electronic type, for electronically storing the software program.

15. An electronic book for interfacing with a computer system with an audio and visual output, said computer system having sensor means including a touch pen for identifying specific spacial locations of visual indicia printed in the book, said electronic book comprising:

a plurality of sheets containing visual indicia which provide operating instructions, the sheets being bound together along one edge in a book format, and being capable of being sequentially displayed to the user;

a read only memory device for electronically storing information coordinated with the spacial location of the visual indicia on the sheets, the read only memory being operatively mounted in the book format and storing a program, wherein operating instructions for running the program are provided by the visual indicia; and connector means for electrically and detachably connecting the read only memory devices to the computer system so that the electronic book with the read only memory device is removably installed to the computer system, wherein in response to a user's operation to cause the touch pen to touch a location related to a desired indicium on one of the sheets the stored program corresponding to the selected spacial location is inputted to the computer system to provide audio and visual outputs to the user.

16. In an information processing system including a computer-based system and an information storage device for providing an input to the computer-based system, said information storage device comprising:

a plurality of sheets containing visual indicia, said plurality of sheets being bound together as a book and capable of being sequentially displayed to the user;

a read only memory device which stores, in an electronically readable form, information coordinated with a spatial location of the visual indicia on the sheets; and first connector means for deriving the information stored in the read only memory; and said computer-based system comprising:

second connector means to which said first connector means is detachably connected whereby the information storage device with the read only memory device is removably mounted to the computer-based system;

input means including a touch pen for inputting location information of a selected position on a specific sheet relative to the visual indicia;

control means for responding to the input means to address the memory device for providing data corresponding to the spacial location of the visual indicia via said connector means;

processing means for processing the data to provide a video signal corresponding to the spacial location of the position selected by the user for displaying visual indicia on a display screen; and a touch panel for providing further coordinate information relative to the visual indicia selected on the specific sheet by the user.

17. The invention of claim 16, wherein said information storage device includes a sensor circuit integrated into each sheet, the sensor circuit being formed so as to be operationally connected with said input means for providing location information relative to the visual indicia when the information storage device is mounted to the computer-based system.

18. The invention of claim 16, wherein said information storage device includes bar codes relative to the visual indicia on each sheet, and said input means includes means for reading the bar codes.

19. The invention of claim 16, wherein said computer-based system further includes a manual controller for providing further coordinate information relative to the visual indicia for displaying the visual indicium selected by the user on the display screen.

20. An information storing device for use in an apparatus for displaying a visual image on a display screen, said apparatus comprising a storage space on which the information storing device is to be detachably mounted, connector means to which the information storing device is to be detachably connected, and a control means retrieving the data from the information storing device, comprising:

a plurality of sheet plates bound together to form a book format, each sheet plate having a plurality of visual indicia, readable by an operator, indicated at locations of the surface thereof;

an integrated read only memory integratedly assembled on the book format so that the read only memory is detachably mounted together with the book format on the storage space of the apparatus, said read only memory storing a plurality of packets of information which are indicative of the visual indicia and of coordinates at the surfaces of said sheet plates corresponding to positions of the respective visual indicia;

connector means from which said packets of information are to be transmitted to the apparatus when connected to the connector means of the apparatus; and sensor means associated with the respective visual indicia, said sensor means providing a coordinate signal indicative of the specific location at the surface of the sheet plate selected by the operator;

whereby, when the information storing device is mounted on the storage space of the apparatus, said control means retrieves the data from the packet of information corresponding to the specific indicia selected by the operator.

21. An apparatus for displaying a visual image on a display screen comprising:

a storage space on which an information storage device is to be detachably mounted, said information storage device containing a sheet plate with a plurality of visual indicia, readable by an operator, indicated at locations of the surface thereof, a read only memory assembled together with the sheet plate so that the read only memory is detachably mounted together with the sheet plate on the storage space, said read only memory storing a plurality of packets of information indicative of the visual indicia and of coordinates corresponding to positions of the respective visual indicia, connector means from which said packets of information are to be transmitted, and sensor means associated with the respective visual indicia, a connector member to which the connector means of the information storage device is to be detachably connected; and a control means, responsive to the information supplied through said connector means from said information storing device and responsive to a coordinate signal supplied from said sensor means indicative of the specific location at the surface of the sheet plate, retrieving the data from the packet of information corresponding to the specific indicia selected by the operator.

22. The apparatus of claim 21, further comprising a touch pen connected to said control means so that said sensor means supplies the coordinate signal indicative of the specific location at the surface of the sheet plate selected by the operator touching a desired surface area of said sheet plate with said touch pen; and a touch panel electrically connected to said control means so that said touch panel in cooperation with said touch pen supplies the coordinate signal indicative of the location on the display screen at which the selected image is to be displayed, said location being selected by the operator touching a desired location of said touch panel with said touch pen.

* * * * *

UNITED STATES PATENT AND TRADEMARK OFFICE
CERTIFICATE OF CORRECTION

PATENT NO. : 5,739,814
DATED : April 14, 1998
INVENTOR(S) : Makoto Ohara, et. al.

It is certified that error appears in the above-identified patent and that said Letters Patent is hereby corrected as shown below:

On the cover page, under [56] References Cited U.S. PATENT DOCUMENTS, please add:

--5,167,7508  12/1/92  McTaggart .................... 4344/417--.

Signed and Sealed this

Thirtieth Day of June, 1998

*Attest:*

BRUCE LEHMAN

*Attesting Officer*  Commissioner of Patents and Trademarks